Dec. 29, 1970  F. BURNETT  3,550,232

METHOD FOR MAKING ROD END BEARING

Filed May 10, 1968

INVENTOR.
Frank Burnett
BY
Barnard, McGlynn & Reising
ATTORNEYS

United States Patent Office 3,550,232
Patented Dec. 29, 1970

3,550,232
METHOD FOR MAKING ROD END BEARING
Frank Burnett, Costa Mesa, Calif., assignor to Lear Siegler, Inc., Santa Monica, Calif., a corporation of Delaware
Filed May 10, 1968, Ser. No. 728,160
Int. Cl. B23p *11/00;* B23k *31/02*
U.S. Cl. 29—149.5                 7 Claims

ABSTRACT OF THE DISCLOSURE

In accordance with the invention a low friction lined spherical rod-end bearing is manufactured by bending into conformity with an inner spherical bearing element, an outer bearing element which surrounds the inner element and which has a low friction liner in sliding contact with the inner element, and then welding a pre-formed rod member to the outer surface of the outer bearing element.

---

The subject matter of the present invention is an improved low cost method for manufacturing a spherical rod-end bearing of the type having a low friction liner to provide self-lubrication. Such bearings are conventionally manufactured by first lining a cylindrical race member with a low friction organic resin material, swaging the race around an inner truncated ball element to thereby bend the race to a conforming spherical shape, machining the outer now spherical surface of the race to cylindrical shape and then inserting the race with its assembled inner truncated element into the cylindrical opening of the ring which is an integral part of a pre-formed rod-end body machined from a unitary block of metal stock. After the race with its assembled inner truncated ball element is so inserted, the edge portions of the opening in the ring of the rod-end body are coined over to retain the race-inner bearing element assembly in the rod-end. Such a method involves considerable expense because of the large number of machining operations necessary, particularly those for forming the rod-end body from a block of metal stock. As an alternative procedure, the internal cylindrical surface in the opening of the rod-end body ring can be covered with the low friction organic resin liner material and the ring then deformed into spherical conformity with an inner spherical bearing element. However, this has a disadvantage in that to obtain conformity between the inner spherical bearing element and that circumferential portion of the ring which joins to the rod portion of the rod-end body, considerable metal movement within the ring is necessary. This in turn places significant limitations on the type of low friction liner material which can be used since the best low friction liner material, Teflon cloth, is easily degraded by an excessive pressure between its metal backing and the inner spherical bearing element. Indeed, even low friction liner materials of lesser quality are easily extruded out or otherwise degraded by the application of the force necessary to conform the rod-end ring into spherical mated relationship with the inner bearing element.

It is the chief object of the present invention to provide a method for manufacturing a self-lubricating spherical rod-end bearing at low cost and wherein the method enables use of preferred liner materials without hazard of injury to the liner material during processing.

Briefly, this and other objects of the invention are accomplished by bending a low friction lined metal race member into spherical conformity with a truncated ball member and thereafter welding a preformed rod member to the race. During the welding operation the truncated ball member must be maintained concentric to the race so as to have full contact about its periphery with the race member. With the truncated ball in this position it serves as a reinforcing backing to the race member so that the race member can withstand the pressure applied to it during welding without race deformation. Additionally and equally importantly, with the truncated ball member in this position, it serves as a heat sink thereby rapidly absorbing and dissipating the heat applied to the liner during welding and hence preventing heat degradation of the liner. There need be no machining operations to the race member after it is bent into spherical conformity with the truncated ball and the machining operations used to pre-form the rod member can be very simple and inexpensive, as compared with the machining operations heretofore needed to form a full rod-end body with a unitary ring.

Other objects, features and advantages of the invention will appear more fully from the following detailed description of preferred embodiments thereof made with reference to the drawings in which.

Figure 1:
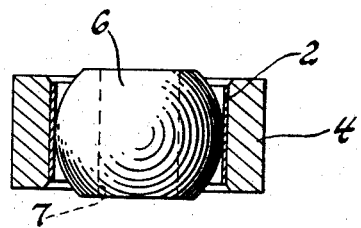
FIG. 1 is a side view in partial section of a truncated ball and low friction lined race assembly prior to bending the race into spherical conformity with the ball.

Referring now to FIG. 1, as a first or preliminary step in the process a low friction organic resin liner material 2 is applied to the inner surface of a cylindrical metal race member 4. The preferred liner material is Teflon cloth embedded in a thermosetting resin, such as phenol formaldehyde resin, which bonds the Teflon cloth to the race. Bearings having such low friction liner constructions are disclosed and claimed in U.S. Pat. 2,885,248 and Reissue 24,765. The latter patent shows the preferred type of Teflon cloth liner which consists of compound woven cloth having a low friction facing of Teflon threads interwoven with a backing ply of cotton or other bondable threads which greatly increase the bond strength between the cloth liner and the thermosetting resin. The thermosetting resin should be in its heat-softenable state, i.e., in its so called B stage, at this point in the process so that it is relatively pliable and flexible while the race is bent around the ball as will hereinafter be described. After the bending operation the assembly can be heated to thereby cure the thermosetting resin to its final hardened thermoset state, i.e., to its so called C stage.

Figure 2:
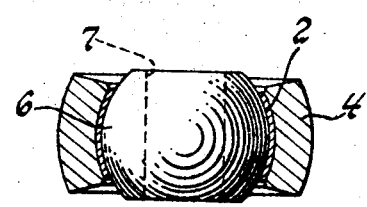
FIG. 2 is a view similar to that of FIG. 1 but showing the assembly after the metal race member is bent into spherical conformity with the ball member.

After the low friction liner has been applied to the inner surface of the cylindrical race, the race is placed around a metal truncated ball member 6, as shown in FIG. 1. The truncated ball member is of conventional construction having a bore 7 extending therethrough. With the race so positioned it is bent to spherical shape, into conformity, i.e., into mated engagement with the truncated ball as shown in FIG. 2. The conventional manner of so bending the race is by a swaging operation using a pair of generally cup-shaped swaging dies, each with a concave spherical inner surface. That is, the assembly shown in FIG. 1 is placed between the opposed concave spherical surfaces of the dies and the dies are moved toward each other whereby the inner spherical surfaces of the dies contact the race member, one at each axial end of the race, and the ends of the race are thereby bent inwardly whereby the race takes its spherical shape as shown in FIG. 2. Such a swaging operation is well known in the art. Other swaging methods can, of course, be used if desired such, for example, as that shown in U.S. patent application Ser. No. 463,123, filed June 11, 1965, in the name of William A. Kuhn, now U.S. Pat. 3,377,681, and assigned to the assignee of the present invention.

As the next step in the process the assembly shown in FIG. 2 can be heated to the curing temperature of the thermosetting resin thereby to fully harden the resin. However, it will be understood that this step can, if desired, be performed after a welding operation as will next be described. Also, it will be understood that if the liner is of a thermoplastic resin or otherwise is such that it does not require a curing operation, this step of curing can, of course, be eliminated.

Figure 3:
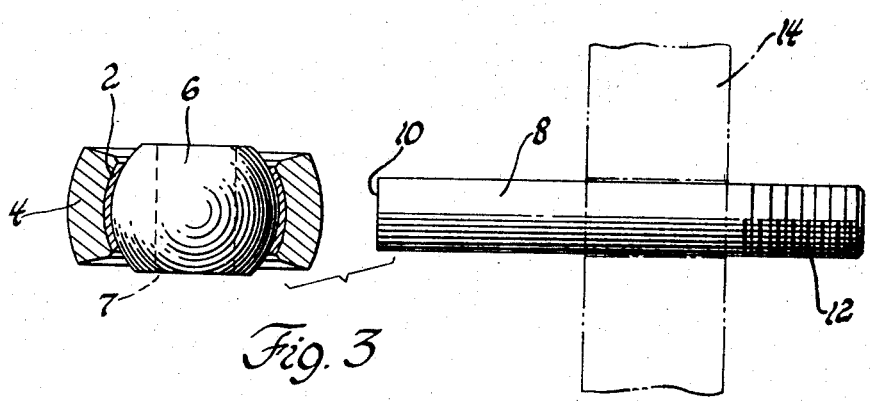
FIG. 3 illustrates the step of welding the preformed rod member to the race.

As the next step in the process, the rod is welded to the race with the truncated ball element 6 being positioned in concentric relationship to the race such that the entire inner surface of the low friction lined race is in contact with the peripheral spherical surface of the ball. To perform the welding operation by friction welding, the ball and lined race assembly is mounted in a suitable jig (not shown) and a preformed rod member 8 (see FIG. 3) is then positioned perpendicular to the axis of the race-ball assembly, with an end 10 of the preformed rod adjacent the race, the longitudinal centerline of the rod being at the axial mid-point of the race. With the rod so positioned, it is spun rapidly around its longitudinal axis and while so spinning it is brought into frictional contact with the race. The friction between the spinning end surface 10 of the rod and the race generates sufficient heat to cause fushion between the rod and the race and thereby creates a strong weld. In actual practice, the threaded end 12 of the rod member 8 can be detachably secured to the center of a flywheel, illustrated at 14, which is caused to rotate by suitable drive means thereby to rotate the rod. A clutch mechanism between the flywheel and the jig holding the race-ball assembly can then be actuated by a torque measuring device which measures the torque of the spinning rod member 8 as it frictionally contacts the race. When the torque reaches a predetermined amount, at which point the weld is complete, the clutch is caused to engage and the entire welded assembly rotates as a unit with the flywheel at which point the flywheel can be stopped and the welded rod-end bearing removed. Another technique is to spin the rod and attached inertia wheel to such a speed that the inertia is just sufficient to provide the good weld at the instant the rod and inertia wheel stop. Friction welding, sometimes referred to as inertia welding, per se, is old and well known in the art.

For friction welding it is preferred that the end of the rod brought into contact with the race for welding be flat though other shapes may be used.

The rod may, if desired, be welded to the race by resistance welding, i.e., by bringing the end of the rod into pressured contact with the race and passing an electric current through the rod and race sufficient to resistance heat and weld the parts together.

Figure 4:
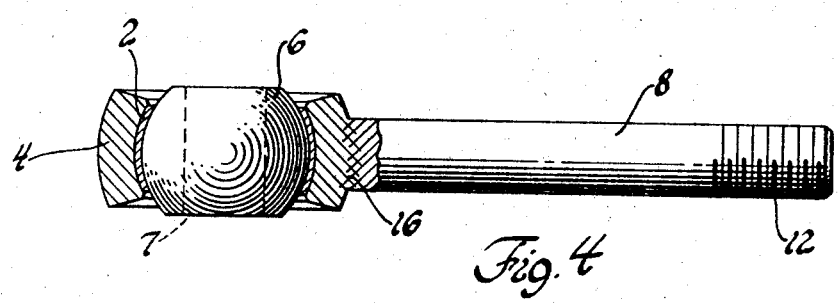
FIG. 4 is a side view in partial section showing the completed rod-end bearing.

After the welding operation is complete, minor machining operations can be used to remove any weld flash and, except for any polishing operations desired, the rod-end bearing is complete. A fully manufactured such bearing is shown in FIG. 4, the weld between the rod and the race being shown at 16.

It is important during the welding operation that the truncated ball be positioned concentrically with the race as shown in FIG. 2. In such position the hoop strength of the truncated ball reinforces the hoop strength of the race to withstand any deformation of the race due to the pressure exerted thereagainst by the rod as it is moved into contact with the race. Further, the mass of the metal of the truncated ball consitutes a heat sink which rapidly removes and dissipates heat from the liner material during the welding and thereby prevents deterioration of the liner material due to the heat. Actually, the heat required to obtain a good weld is well in excess of that which would normally cause extensive deterioration of the liner; however, I have discovered that in fact there is no significant deterioration of the liner from the heat and this, I have theorized, is due at least in part to the heat sink function of the ball during the welding operation. Further, the thickness of the organic resin lining should be thin as compared with the thickness of the metal race and the thickness of the ball. More specifically, the thickness of the lining should preferably be less than $\frac{1}{16}''$ and the thickness of each of the race and of the ball (from periphery to bore) should be at least four times the thickness of the liner.

It is within the purview of the invention to clamp copper or other metal blocks to the race to provide an additional heat sink to further prevent deterioration of the liner. Also, the ball and lined race assembly can be cooled to low temperature prior to the welding operation thereby still further inhibiting damage to the liner from excessive heat.

Figure 5:
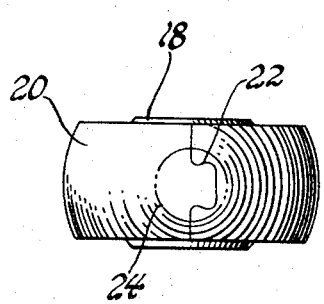
FIG. 5 is a side view illustrating another embodiment of the invention.

In the method described above, the race in its initial form constitutes a cylinder which can be cut from tube stock. In FIG. 5 there is shown a side view of a ball-race assembly made by wrapping a strip of low friction lined metal around the ball member, there being a notch and tab interlock between the ends of the strip such that it is locked around the ball after being wrapped therearound. The truncated ball element is shown at 18, the race formed by wrapping the strip around the ball is shown at 20 and the notch and tab interlock is shown at 22. Where such a race construction is used, the weld between the rod member and the race should preferably be directly over the notch and tab interlock of the race, such location of the welded junction between the rod and the race being shown in outline at 24 in FIG. 5. By utilizing the method of the aforesaid United States application in combination with the method of this invention, as illustrated in FIG. 5, there can be a still further cost reduction in the production of low friction lined spherical rod-end bearings. This, however, is at the sacrifice of some strength of the race and the welded junction between the race and the rod member.

It will be understood that while the invention has been described with reference to certain embodiments thereof, changes may be made within the full and intended scope of the claims which follow.

The embodiments of the invention in which an exclusive property or privilege is claimed are defined as follows:

1. A method for manufacturing a low friction lined spherical rod end bearing comprising bending into spherical conformity with a bored truncated metal ball a metal race having a lining of low friction material and then welding a rod to said race while said truncated ball is in concentric relationship to said race, said lining having a thickness of less than $\frac{1}{16}$ inch and the thickness of each of said metal race and said bored truncated ball being more than four times the thickness of the lining.

2. A method as set forth in claim 1 wherein said lining contains a thermosetting resin and wherein said thermosetting resin is cured to its thermoset condition prior to said welding.

3. A method for manufacturing a low friction lined spherical rod end bearing comprising bending intospherical conformity with a truncated metal ball a metal race having a lining of low friction material and then friction welding a rod to said race while said truncated ball is in concentric relationship to said race.

4. A method for manufacturing a low friction lined spherical rod end bearing comprising bending into spherical conformity with a truncated metal ball a metal race having a lining of low friction material and then electrical resistance welding a rod to said race while said truncated ball is in concentric relationship to said race.

5. A method for manufacturing a low friction lined spherical rod end bearing comprising bending into spherical conformity with a truncated metal ball a metal race having a lining of low friction material and then welding a rod to said race while said truncated ball is in concentric relationship to said race, there being a metal body detachably secured in abutting relationship to said race during said welding to thereby serve as a heat sink.

6. A method for manufacturing a low friction lined spherical rod end bearing comprising bending into spherical conformity with a truncated metal ball a metal race having a lining of low friction material and then welding a rod to said race while said truncated ball is in concentric relationship to said race, said metal race and truncated ball being cooled prior to said welding so as to be at a low temperature at the commencement of said welding.

7. A method for manufacturing a low friction lined spherical rod end bearing comprising bending into spherical conformity with a truncated metal ball a metal race having a lining of low friction material and then welding a rod to said race while said truncated ball is in concentric relationship to said race, said metal race comprising an elongated metal strip bent to annular shape with the ends thereof abutting each other, and said rod being welded to said race over said abutting ends.

References Cited

UNITED STATES PATENTS

| | | | |
|---|---|---|---|
| Re.24,765 | 1/1960 | White | 308—72X |
| 2,885,248 | 5/1959 | White | 308—239 |
| 3,238,602 | 3/1966 | White | 29—149.5B |
| 3,256,007 | 6/1966 | Hunsaker | 29—149.5B |
| 3,266,123 | 8/1966 | McCloskey | 29—149.5B |
| 3,303,557 | 2/1967 | Litsky | 29—441X |

THOMAS H. EAGER, Primary Examiner

U.S. Cl. X.R.

29—441; 308—72